(12) United States Patent
Biester et al.

(10) Patent No.: US 7,654,164 B2
(45) Date of Patent: Feb. 2, 2010

(54) TRAVEL MULTIPLYING DEVICE

(75) Inventors: Klaus Biester, Wienhausen (DE); Gerald S. Baker, Houston, TX (US)

(73) Assignee: Cameron International Corporation, Houston, TX (US)

( * ) Notice: Subject to any disclaimer, the term of this patent is extended or adjusted under 35 U.S.C. 154(b) by 258 days.

(21) Appl. No.: 10/489,374

(22) PCT Filed: Sep. 18, 2002

(86) PCT No.: PCT/EP02/10466

§ 371 (c)(1), (2), (4) Date: Jul. 28, 2004

(87) PCT Pub. No.: WO03/025428

PCT Pub. Date: Mar. 27, 2003

(65) Prior Publication Data

US 2004/0250641 A1 Dec. 16, 2004

(30) Foreign Application Priority Data

Sep. 19, 2001 (DE) .............................. 201 15 469 U

(51) Int. Cl.
*F16H 25/16* (2006.01)
*F16K 31/44* (2006.01)
(52) U.S. Cl. .......................................... 74/57; 251/252
(58) Field of Classification Search ...................... 74/25, 74/55–59, 89.23, 337.5; 251/252–254, 256
See application file for complete search history.

(56) References Cited

U.S. PATENT DOCUMENTS 2,246,733 A * 6/1941 Kiefer .............................. 74/57
3,298,659 A * 1/1967 Douwe ......................... 251/14
3,776,106 A * 12/1973 Pish ............................... 92/33
4,235,258 A * 11/1980 Uno et al. .................... 137/556
4,651,969 A * 3/1987 Dowdall ....................... 251/14

(Continued)

FOREIGN PATENT DOCUMENTS

DE 304 771 6/1919

(Continued)

OTHER PUBLICATIONS

International Search Report for Appln. No. PCT/EP02/10466 dated Feb. 4, 2003 (pp. 3).

*Primary Examiner*—Richard WL Ridley
*Assistant Examiner*—James Pilkington
(74) *Attorney, Agent, or Firm*—Conley Rose, P.C.

(57) ABSTRACT

(57) A travel multiplying device (1) has at least one outer pipe (2), one inner pipe (3) and one intermediate pipe (4) positioned between them, which can be moved relative to each other in the longitudinal direction (5) each by a particular distance of travel (16-36) with at least one cut-out formed (11-17) between facing surfaces (7, 8, 9, 10) of each pipe (2, 3, 4), which cut-outs show different gradients (18, 19) relative to a transverse plane (21) through the pipes (2, 3, 4), and which are coupled with each other by at least one movement linking element (22-26) to link the movements of the pipes. By such a travel multiplying device, a small movement of one element is transformed into a magnifying movement of another element in a simply designed and reliable manner.

25 Claims, 4 Drawing Sheets

U.S. PATENT DOCUMENTS

| | | | | |
|---|---|---|---|---|
| 4,666,124 | A | * | 5/1987 | Giacobbi .................. 251/56 |
| 5,005,805 | A | * | 4/1991 | Morris et al. ............... 251/229 |
| 5,836,403 | A | * | 11/1998 | Putney et al. .............. 173/205 |
| 6,024,422 | A | | 2/2000 | Drennen et al. |
| 6,860,167 | B2 | * | 3/2005 | Schmidt et al. ............... 74/56 |

FOREIGN PATENT DOCUMENTS

| | | | |
|---|---|---|---|
| EP | 0 365 377 | | 4/1990 |
| EP | 0 893 624 | | 1/1999 |
| EP | 0893624 | * | 1/1999 |
| FR | 2 023 587 | | 8/1970 |

* cited by examiner

TRAVEL MULTIPLYING DEVICE

CROSS-REFERENCE TO RELATED APPLICATION

This application is a National Phase entry of PCT Application No. PCT/EP02/10466 filed 18 Sep. 2002 which claims priority to German Application No. 201 15 469.2 filed 19 Sep. 2001 both of which are incorporated herein by reference.

STATEMENT REGARDING FEDERALLY SPONSORED RESEARCH OR DEVELOPMENT

Not applicable.

BACKGROUND OF THE INVENTION

Field of the Invention

The invention refers to a travel multiplying device whereby a small travel of one element can be transformed into a multiplied travel of another element, for example for activating valves, throttles and other devices in the field of petroleum and natural gas extraction.

BRIEF SUMMARY OF THE PREFERRED EMBODIMENTS

The intention is based on the object to provide a travel multiplying device, whereby a small movement of one element is transformed into a magnified movement of another element in a simply designed and reliable manner.

This object is solved by means of a travel multiplying device with an outer pipe, an inner pipe, and an intermediate pipe between them, each of which can be moved relative to each other in the longitudinal direction by a certain length of travel, where there is at least one cutout in each pipe in surfaces facing each other, which cutouts have different gradients relative to a transverse plane through the pipes, and which are connected to each other by means of at least one movement linking element to link the movements of the pipes.

One of the pipes is fixed, and the other two pipes can be moved relative to the fixed pipe. In the process, one of the pipes is moved relatively slightly and the other of these pipes is moved by a greater multiple, so that a multiplication of the travel takes place.

The multiplication of travel is achieved in this connection by the fact that there are cutouts in the corresponding pipes, with cutouts in different pipes moving in connection with each other by means of at least one movement linking element. The movement of one pipe is thereby transformed into a corresponding movement of the other pipe by means of the linkage through the movement linking element. The different ratios of travel of the two pipes which are movable relative to the fixed pipe derives from the different gradients of the cutouts. That is, because the movement of the pipes is connected due to the movement linkage by means of cutouts and a movement linking element, the pipe with the cutout which has a greater gradient relative to the transverse plane through the pipes moved by a distance which is a multiple relative to the pipe which has the cutout with the smaller gradient.

With regard to the intermediate pipe, there can be appropriate cutouts formed in both the outside and the inside of the intermediate pipe to couple its movement to both the outer and the inner pipes. To simplify the design of the travel multiplying device according to the invention in this respect, the cutout in the intermediate pipe can be in the form of a slotted cutout in the wall of the intermediate pipe. By means of this slotted cutout, the movement linking element can connect the cutouts in the outer pipe and the inner pipe with each other through the slotted cutout in the intermediate pipe, thereby coupling the inner and outer pipes with each other directly.

For correct guidance of the movement linking element along the cutout it is sufficient in this conjunction if the cutouts in the outer and inner pipes are in the form of recessed cutouts. That is, the cutouts extend in the form of grooves, and with a depth less than the wall thickness of the respective pipes, in the corresponding surfaces thereof.

In this connection, it should also be regarded as advantageous if the cutout in the outer pipe is formed in its inner surface and the cutout in the inner pipe is formed in its outer surface.

If the cutouts in the inner and intermediate pipes have appropriate non-zero gradients, it is sufficient for guiding the movement linking element in the area of the outer pipe if the cutout of the outer pipe extends in the transverse plane, i.e. has a gradient of zero.

In order to be able to transform a small movement of the inner pipe into a larger movement of the intermediate pipe, the cutout in the intermediate pipe can have a greater gradient than the cutout in the inner pipe.

The movement linking element can be designed in various ways. A simple embodiment can be envisioned for example as having a movement linking element placed in the cutout of the outer pipe or an inner surface of the outer pipe, which reaches through the slotted cutout in the intermediate pipe as far as the cutout in the inner pipe. In this way the movement linking element would be fixed in the inner surface of the outer pipe or would be held so that it could move in the cutout of the latter. In this case, if the inner pipe is moved for example in the longitudinal direction of the pipes, the cutouts in the inner and intermediate pipes will move along the movement linking element, and because of the differing gradients of the cutouts the movement of the inner pipe will be transformed into an amplification of the movement of the intermediate pipe.

However, in order to reduce the friction between the various pipes as they move relative to each other, the movement linking element can be a ball which moves along at least two cutouts which face each other in different pipes.

Assembly of the inner or intermediate pipe without special orientation of the inner or intermediate pipe relative to the outer pipe is simple, if the cutout in the outer pipe is a ring cutout which runs around the inside of the latter.

In order to be able to move the inner pipe easily relative to the other pipes, there can be at least a pair of cutouts formed in the outer surface of the inner pipe, with the cutouts inclining toward each other. Thereby an axial movement of the inner pipe can be converted into a corresponding axial movement of the intermediate pipe.

In order to convert a screwing movement of the inner pipe relative to the outer pipe into a corresponding screwing movement of the intermediate pipe with a larger travel relative to the outer pipe, the cutouts in the outer side of the inner pipe may extend inclined in the same direction.

In order to synchronize in this connection the screwing movement of the inner pipe and the intermediate pipe in a manner that they are shiftable about the same angle of rotation relative to the outer pipe, at least one vertically extending cutout may be arranged between the inclined cutouts in the outer side of the inner pipe. This cutout is associated to a corresponding also vertically extending cutout or slotted cutout in the intermediate pipe so that by a corresponding movement linking element in these vertically extending cutouts the rotation of inner pipe and intermediate pipe is coupled.

The bearing of the inner pipe can be improved still further if, for example, two pairs of cutouts are formed in the outer surface of the inner pipe in pairs, symmetrical to the longitudinal axis of the inner pipe. In this way the inner pipe is supported and guided at least four points around its circumference.

It is possible for only one pair of cutouts in the inner pipe to be coordinated with corresponding slotted openings in the intermediate pipe, for example, while the other pair of cutouts in the inner pipe could be coordinated with corresponding cutouts in the inner surface of the intermediate pipe. However, in order to be able to guide the intermediate pipe also more easily and with less friction, the slotted cutouts in the intermediate pipe can also be formed in pairs corresponding to the cutouts in the inner pipe.

In a simple embodiment, all of the cutouts in the inner pipe and/or all of the slotted cutouts in the intermediate pipe can have their ends positioned in two transverse planes of the corresponding pipe, with the transverse planes of the inner pipe spaced at a smaller interval than the transverse planes of the intermediate pipe.

It is further possible that not only a travel of the inner pipe is converted into an enlarged travel by the intermediate pipe, but at the same time an enlarged or diminished angle of rotation is achieved at the intermediate pipe when rotating the inner pipe. This may for instance be implemented in that the cutouts of the inner pipe in projection towards the transverse plane have a length different to the cutouts of the intermediate pipe. It must be noted that in this case also the vertical cutouts must extend in an inclined manner to enable a relative rotation between the inner pipe and the outer pipe.

It is possible to have multiple movement linking elements positioned between corresponding cutouts in the inner and outer pipes and the associated slotted cutout. It is sufficient, however, if a ball is guided along the matching cutout and slotted cutout as the movement linking element.

If the outer pipe is the fixed element in the travel multiplying device, then to multiply the travel it is sufficient if the inner pipe and the intermediate pipe are in the form of pipe segments; that is, if their length is shorter than that of the outer pipe.

The movement of the inner pipe can be linked to a travel initiating element 40. Such a travel initiating element 40 can be for example an actuator, a shaft, a lever, a rotating spindle or the like. This travel initiating element 40 is coupled with the movement of the inner pipe 3 in such a way that a corresponding movement of the travel initiating element 40 can be converted into a displacement of the inner pipe 3 relative to the outer pipe 2. When the inner pipe 3 is thus displaced by a certain length of travel inside the outer pipe 2, the intermediate pipe 4 is displaced relative to the outer pipe 2 by a multiple of that travel distance. In this connection the intermediate pipe 4 can be dynamically linked to an adjusting element 42. This adjusting element 42 connects a valve, a throttle, a so-called "blowout preventer" or other adjustable parts, for example. Here a relatively small movement of the travel initiating, element 40 is transformed by the travel multiplying device in accordance with the invention into a considerably enlarged movement of the adjusting element 42.

If the movement linking element is in a fixed position for example on the inside of the outer pipe, then the inner and intermediate pipes can be mounted jointly so that they can rotate relative to the outer pipe to multiply the travel. In this case the inner pipe and the intermediate pipe are coupled in such a way that they do not rotate relative to each other. When cutouts are used in all three pipes, with balls which can move along these cutouts as the movement linking elements, it is advantageous in this connection if all of the pipes are non-rotating relative to each other. This can be achieved for example by an appropriate cross section of the pipes, so that the pipes are inserted into each other with positive locking.

In another embodiment it is further conceivable that the inner pipe and the intermediate pipe can be rotated relative to the outer pipe and/or relative to each other.

The following section contains an explanation of an advantageous embodiment of the invention on the basis of the figures included in the drawing.

DETAILED DESCRIPTION OF THE PREFERRED EMBODIMENTS

Figure 1:
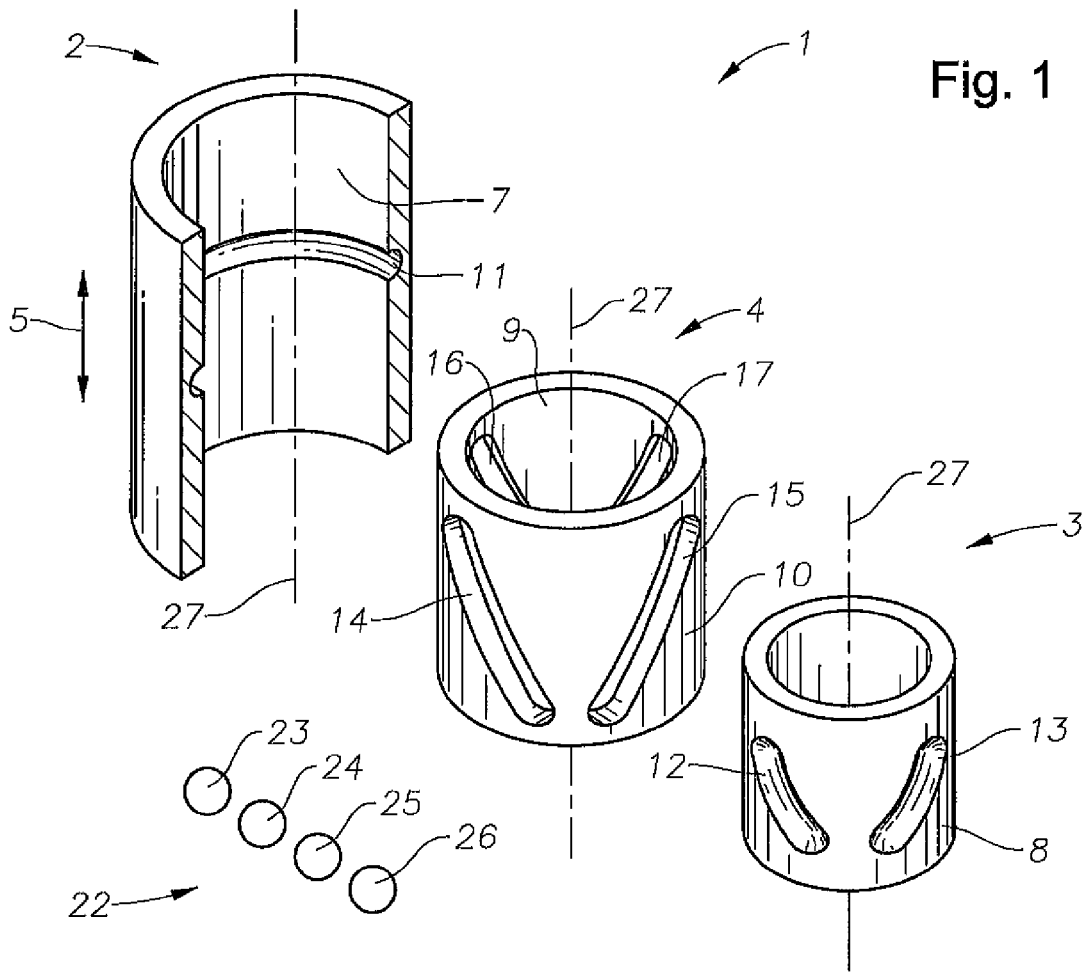
FIG. 1 is a basic illustration of a disassembled embodiment of a travel multiplying device in accordance with the invention.

In FIG. 1 the travel multiplying device 1 in accordance with the invention is pulled apart into individual parts, with an outer pipe 2 of the travel multiplying device 1 only half shown and with its length shortened.

Figure 2:
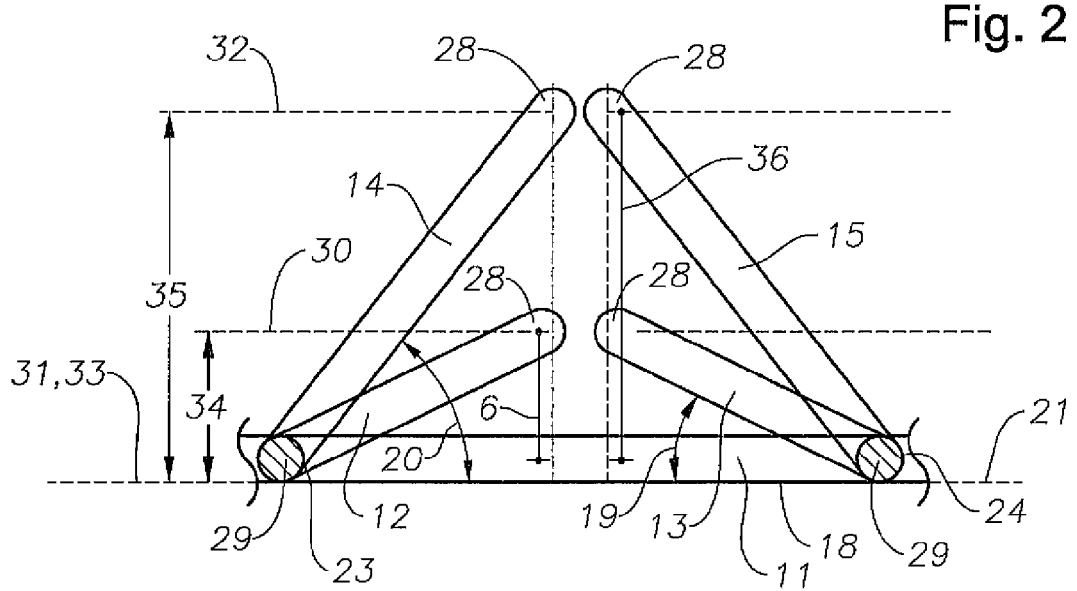
FIG. 2 is a diagram to illustrate the interaction of cutouts in the travel multiplying device.

The outer pipe 2 shows on its inner surface 7 a cutout 11 in the form of a circular cutout which runs around the entire inner surface in a transverse plane 21, see FIG. 2.

Into the outer pipe 2 one can insert an intermediate pipe segment 4, which can extend for example past one end of the outer pipe 2. The intermediate pipe 4 has slotted cutouts 14-17 in its jacket, as cutouts which couple its inner surface 9 and outer surface 10 with each other.

An inner pipe 3 can be inserted into the intermediate pipe 4. In the outer surface 8 of the inner pipe there are two cutouts 12,13 visible; these cutouts represent a pair of cutouts running toward each other and inclined in the upward direction in FIG. 1. An additional pair of such cutouts is on the back side of the inner pipe 3, which is not visible in FIG. 1.

All of the pipes 2, 3, 4 have a longitudinal axis 27, and in their assembled state are concentric to each other.

As movement linking elements 22 a number of balls 23-26 are placed in the cutouts 11-17. In this connection their placement is such that ball 23 far example is inserted into cutout 12 of the inner pipe 3 and protrudes from this cutout far enough so that it reaches through the slotted cutout 14 in the intermediate pipe 4 and engages the ring cutout 11 an the inner surface 7 of the outer pipe 2. The same applies by analogy to the other balls 24-26.

FIG. 2 shows a basic representation to explain the multiplication of travel by the device in accordance with the invention.

In particular, it shows the cutouts 11 an the inner surface 7 of the outer pipe 2, the slotted cutouts 14 and 15 of the intermediate pipe 4, and two cutouts 12,13 in the inner pipe 3.

The cutout 11 lies essentially in a transverse plane 21 which runs perpendicular to the longitudinal direction 5 of the various pipes. Lower ends 29 of the cutouts 12,13 and of the slotted cutouts 14,15 lie in transverse planes 31, 33 which are identical with the transverse plane 21. Upper ends 28 of the cutouts 12-15 lie in transverse planes 30, 32. An interval 6 between the transverse planes 30, 31, between which the cutouts 12, 13 extend, is smaller than an interval 35 between the transverse planes 32 and 33, between which the slotted cutouts 14 and 15 extend. In the overlapping lower ends 29 of the cutouts are balls 23, 24, which at the same time engage the cutout 11 of the outer pipe 2.

It is also shown in particular in FIG. 2 that the cutouts 12,13 are inclined at an angle 19 relative to the transverse plane 21 or 31 and converge toward each other. In equivalent manner the slotted cutouts 14, 15 are inclined at an angle 20 relative to the transverse plane 21 or 33, and also converge toward each other. The respective cutouts 12,13 and 14,15 are arranged symmetrically with respect to a central axis between the cutouts; see the other figures. Additional corresponding cutouts or slotted cutouts are arranged symmetrically to the longitudinal axis 27 with respect to the cutouts shown in FIG. 2 in the intermediate pipe 4 and the inner pipe 3; see for example FIGS. 1 and 4.

If the intermediate pipe 4 moves longitudinally relative to the outer pipe 2, it can be displaced by a maximum travel distance 6, see FIG. 2, in the longitudinal direction 5. Simultaneous with the movement of the inner pipe 3, the intermediate pipe 4 is likewise moved by the movement linkage by means of the various balls 23-26 in the longitudinal direction 5 relative to the outer pipe 2 by a travel distance 36. The travel distance 36 is greater than the travel distance 6 by a multiple. It must be noted that the gradients or angles 19 for the cutouts 12,13 in particular are shown exaggerated in comparison to the gradient or angle 20 of the slotted cutouts 14,15, so that in reality a considerably greater multiplication of travel takes place.

In the embodiment according to FIG. 2 it must also be noted that the cutouts are inclined in reverse compared to the cutouts in FIGS. 1 and 3 to 5, so that in the exemplary implementation according to FIG. 2 the inner pipe 3 moves in the opposite direction relative to the outer pipe 2 compared to the implementation in FIGS. 1 and 3 to 5. The same is true of the intermediate pipe 4.

Figure 3:
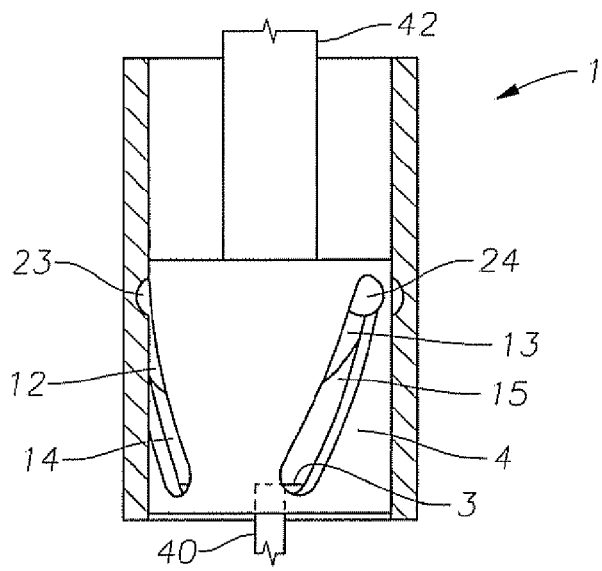
FIG. 3 is the travel multiplying device according to FIG. 1 in an initial position.
Figure 4:
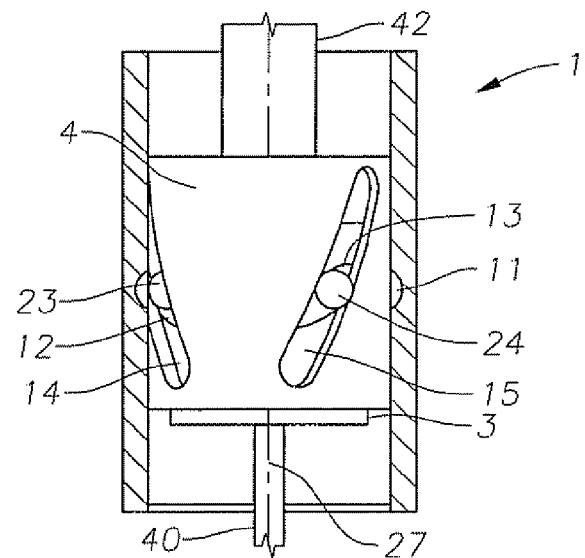
FIG. 4 is the travel multiplying device according to FIG. 1 in a medium travel position.
Figure 5:
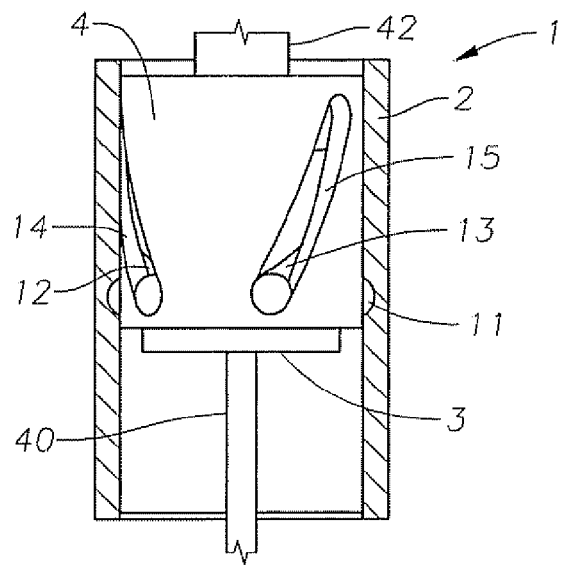
FIG. 5 is the travel multiplying device according to FIG. 1 in the maximum travel position.

FIGS. 3 to 5 illustrate various travel positions of the intermediate pipe 4 and inner pipe 3.

In FIG. 3 the inner pipe 3 and intermediate pipe 4 are located in their starting position with travel equal to zero. At the same time the respective balls 23-26 are in contact with the upper ends of the corresponding cutouts, and also engage the ring cutout 11 of the outer pipe 2.

In FIG. 4 the inner pipe 3 and intermediate pipe 4 are shown in a mid-travel position. It can already be seen here that the intermediate pipe 4 is moving rapidly ahead of the inner pipe 3 in its displacement.

FIG. 5 shows the maximum travel position, where the respective balls 23-26 are in contact with the lower ends of the cutouts 12-17 and simultaneously engage the ring cutout 11 of the outer pipe 2.

Figure 6:
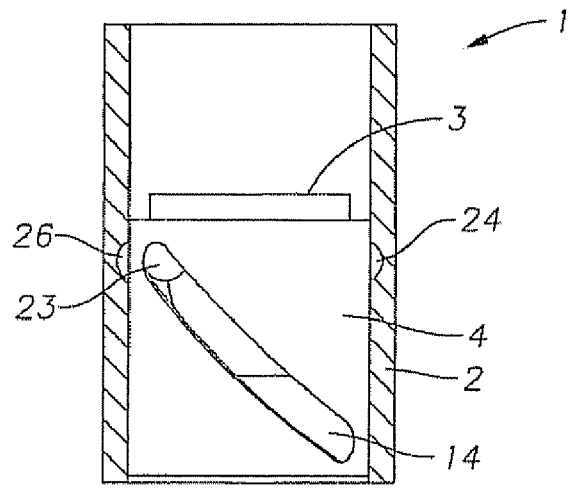
FIG. 6 is the travel multiplying device according to a further embodiment in an initial position analog to FIG. 3.
Figure 7:
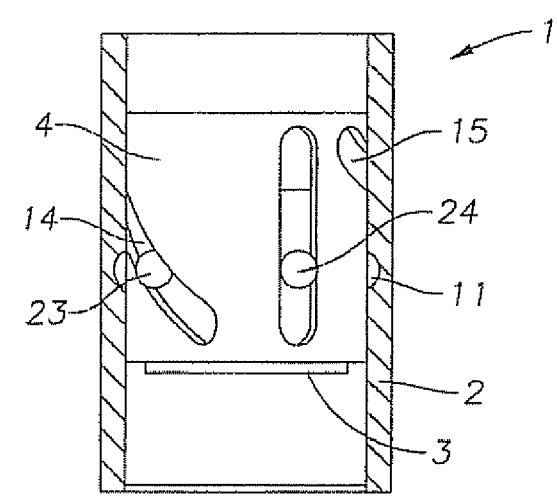
FIG. 7 is the travel multiplying device according to the further embodiment in a travel position analog to FIG. 4.
Figure 8:
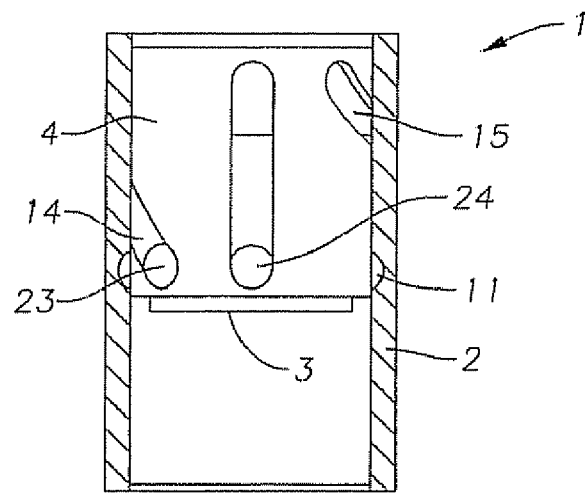
FIG. 8 is the travel multiplying device according to the further embodiment in a travel position analog to FIG. 5.

In FIGS. 6 to 8 the travel positions are illustrated analog to FIGS. 3 to 5 for a further embodiment of the travel multiplying device. Identical parts are in these Figures, as well as in the preceding Figures, provided by identical reference numerals.

Figure 9:
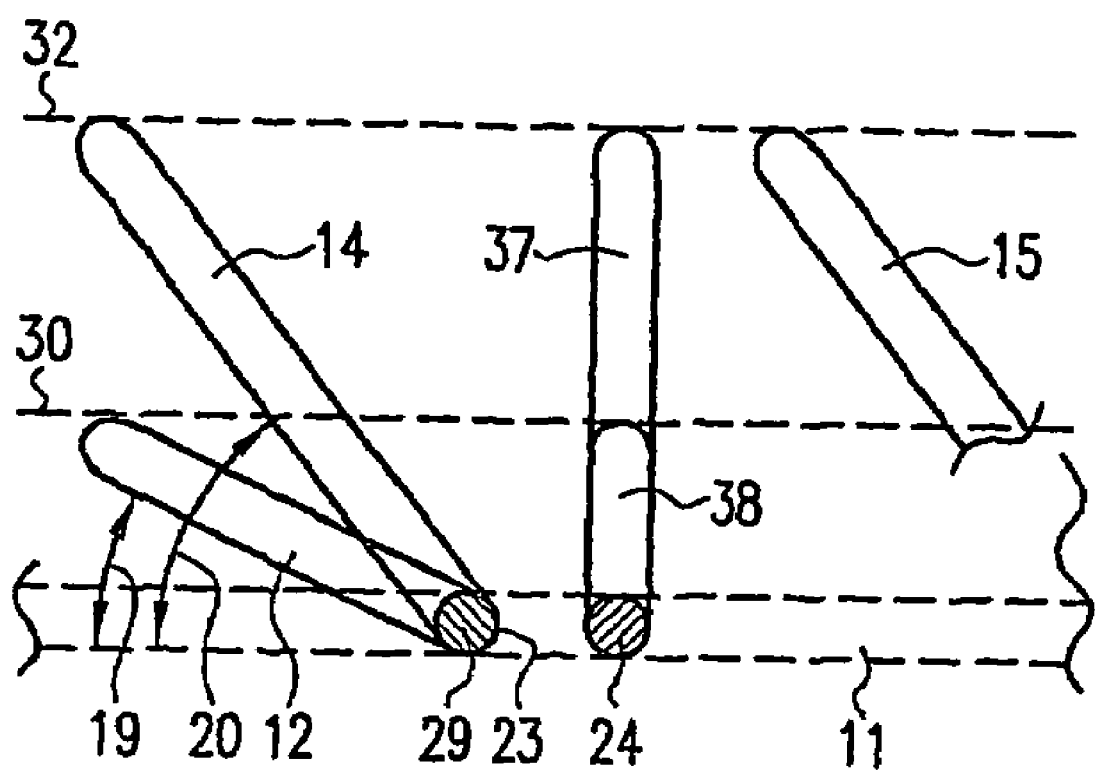
FIG. 9 is a diagram to illustrate the interaction of cutouts in the travel multiplying device according to the further embodiment.

The embodiment according to FIGS. 6 to 8 differs from the previously described embodiment in particular in that the inclined extending cutouts 12, 13, also see FIG. 9, extend inclined in the same direction on the outer side of the inner pipe 3. This applies analogously to the inclined slotted cutouts 14, 15 in the intermediate pipe 4. Vertical cutouts or slotted cutouts 38, 37 are provided between the inclined cutouts or slotted cutouts.

If the inner pipe 3 according to FIG. 6 is turned, the ball 23 is for instance moved along the cutout 11 on the inner side of the outer pipe 2 and caused by the simultaneous engagement of this ball 23 into the cutout 12, see FIG. 9, the inner pipe 3 in FIGS. 6 to 8 in the drawing sheet plane is moved upward in a screwing movement. At the same time the intermediate pipe is also moved in the Figure plane upwards caused by the engagement of the ball 23 into the slotted cutout 14 of the intermediate pipe 4. Caused by the different gradients of the cutouts, a multiplication of the travel in the intermediate pipe 4 in comparison to the inner pipe 3 takes place.

FIG. 6 shows a starting position, FIG. 7 shows an intermediate position and FIG. 8 shows a final position, wherein in FIG. 8 the inner pipe and the intermediate pipe 4 are arranged at the same angle relative to the outer pipe 2 in a rotated manner.

FIG. 9 shows a diagram analog to FIG. 2 for the embodiment according to FIGS. 6 to 8.

In this embodiment it also applies that for instance the slotted cutouts 14, 15 and 37 end in the same transverse plane 32 and are arranged with their respective other ends in the transverse plane belonging to the cutout 11 of the outer pipe. An end of the cutouts 12, 38 of the inner pipe is also arranged in the transverse plane of the cutout 11 and the respective other ends of these cutouts 12, 38 are arranged in the transverse plane 30. The corresponding travel multiplication results from the difference intervals of the transverse planes 30, 32 with respect to the recess 11.

In this connection it must be noted that it is possible in further embodiments that the inner pipe 3 and the intermediate pipe 4 can be rotated about different angles relative to the outer tube 2 in the travel multiplying device. This may for instance be implemented in that the lengths of the recesses 12, 38 in projection towards the recess 11 or the transverse plane 21 associated thereto, see FIG. 2, are different to the corresponding lengths of the slotted cutouts 14, 15. If for instance the projected length of the recess 12 is smaller than the projected length of the slotted cutout 14, the intermediate pipe 4 is rotated about a greater angle to the outer pipe 2 than the inner pipe between the positions of the pipes according to FIGS. 6 and 8. It must be noted that in this case the vertical cutout 38 must also extend in a correspondingly inclined manner.

It should be noted that the illustration according to the figures only shows an example of a displacement of the inner and intermediate pipes in the vertical direction. The travel multiplication device can of course be used with every possible spatial orientation of the pipes.

Let it also be noted that it is equally possible for example for the inner pipe 3 to have the ring cutout 11 on its outer surface 8 and to serve as a fixed pipe, relative to which the intermediate pipe 4 and the outer pipe 2 move. In this case the cutouts 12,13 would be on the inside 7 of the outer pipe 2, and instead of a multiplication of travel inside the outer pipe a multiplication of travel would take place outside of the inner pipe.

The invention claimed is:

1. A travel multiplying device comprising:
   at least one outer pipe, one inner pipe, and one intermediate pipe positioned between the inner pipe and the outer pipe, the inner pipe and the intermediate pipe being movable in the longitudinal direction and each being movable in the longitudinal direction by a particular longitudinal distance of travel greater than zero, with the intermediate pipe having an elongated slit, and the inner pipe and the outer pipe each having at least one cutout formed between facing surfaces of the inner pipe and the outer pipe, the cutouts and slit having different gradients relative to a transverse plane through the pipes,
   the outer pipe, the inner pipe, and the intermediate pipe are coupled with each other by at least one movement linking element extending through the slit and into the cutouts of the inner pipe and the outer pipe, and the movement linking element moving within the elongated slit and moving longitudinally relative to the cutouts to link movements of the inner pipe and intermediate pipe,
   the inner pipe being moved a first longitudinal distance of travel greater than zero,
   and the movement linking element moves in the slit and cutouts to cause the intermediate pipe to move a second longitudinal distance of travel greater than the first longitudinal distance of travel.

2. The travel multiplying device as in claim 1 wherein the cutout of the outer pipe and the cutout of the inner pipe are each formed as a groove receiving the linking element, the groove in the outer pipe surrounds the intermediate pipe.

3. The travel multiplying device as in claim 1 wherein the movement linking element is a ball that moves through the elongated slit and along the cutout of the inner pipe and the cutout of the outer pipe.

4. The travel multiplying device as in claim 1 wherein at least one pair of cutouts is formed in an outer surface of the inner pipe, wherein each of the cutouts extends at an inclination toward the other cutout and has a length extending between a first end and a second end not connected to the first end, such that the cutouts do not encircle the inner pipe.

5. The travel multiplying device that as in claim 1 wherein the movement linking element is a ball guided longitudinally along respective corresponding cutouts and slits.

6. The travel multiplying device as in claim 1 wherein the inner pipe and intermediate pipe are formed as pipe segments.

7. The travel multiplying device as in claim 1 wherein the inner pipe can be linked for longitudinal motion with a travel initiating element and the intermediate pipe can be linked for longitudinal motion with an actuator element with the outer pipe in a stationary position.

8. The travel multiplying device as in claim 1 wherein the pipes cannot be rotated relative to each other.

9. The travel multiplying device as in claim 1 wherein at least one pair of cutouts is formed in the outer surface of the inner pipe, with the at least one pair of cutouts extending inclined in the same direction.

10. The travel multiplying device as in claim 9 wherein at least one vertically extending cutout is arranged between the at least one pair of cutouts of the inner pipe.

11. A travel multiplying device comprising:
    at least one outer pipe, one inner pipe, and one intermediate pipe positioned between the inner pipe and the outer pipe, the pipes being movable relative to each other in the longitudinal direction, each by a particular longitudinal distance of travel, with the intermediate pipe having a slit, and the inner pipe and the outer pipe each having at least one cutout formed between facing surfaces of the inner pipe and the outer pipe, the cutouts and slit having different gradients relative to a transverse plane through the pipes,
    the outer pipe, the inner pipe, and the intermediate pipe are coupled with each other by at least one movement linking element extending through the slit and into the cutout of the inner pipe and the cutout of the outer pipe and the movement linking element moving within the slit and moving longitudinally relative to the cutouts to link movements of the inner pipe and intermediate pipe,
    the inner pipe being moved a first longitudinal distance of travel greater than zero,
    the movement linking element moves in the slit and cutouts, to cause the intermediate pipe to move a second longitudinal distance of travel greater than the first longitudinal distance of travel, wherein the cutout of the outer pipe extends circumferentially around the facing surface formed on an inner surface of the outer pipe and the cutout in the inner pipe is a groove formed on an outer surface of the inner pipe.

12. The travel multiplying device as in claim 11 wherein the cutout of the outer pipe is a ring cutout that extends around the inside of the outer pipe.

13. A travel multiplying device comprising:
    at least one outer pipe, one inner pipe, and one intermediate pipe positioned between the inner pipe and the outer pipe, the pipes being movable relative to each other in the longitudinal direction, each by a particular longitudinal distance of travel, with the intermediate pipe having a slit, and the inner pipe and the outer pipe each having at least one cutout formed between facing surfaces of the inner pipe and the outer pipe, the cutouts and slit having different gradients relative to a transverse plane through the pipes,
    the outer pipe, the inner pipe and the intermediate pipe are coupled with each other by at least one movement linking element extending through the slit and into the cutout of the inner pipe and the cutout of the outer pipe, and the movement linking element moving within the slit and moving longitudinally relative to the cutouts to link movements of the inner pipe and the intermediate pipe,
    the inner pipe being moved a first longitudinal distance of travel greater than zero, with the movement linking element moving in the slit and cutouts, to cause the intermediate pipe to move a second longitudinal distance of travel greater than the first longitudinal distance of travel, wherein the cutout in the outer pipe is a circumferential groove that extends in the transverse plane.

14. A travel multiplying device comprising:
    at least one outer pipe, one inner pipe, and one intermediate pipe positioned between the inner pipe and the outer pipe, the pipes being movable relative to each other in the longitudinal direction, each by a particular longitudinal distance of travel, with the intermediate pipe having a slit, and the inner pipe and the outer pipe each having at least one cutout formed between facing surfaces of the inner pipe and the outer pipe, the cutouts and slit having different gradients relative to a transverse plane through the pipes, the outer pipe, the inner pipe, and the intermediate pipe are coupled with each other by at least one movement linking element extending through the slit and into the cutout of the inner pipe and the cutout of the outer pipe, and the movement linking element moving within the slit and moving longitudinally relative to the cutouts to link movements of the inner pipe and intermediate pipe, the inner pipe being moved a first longitudinal distance of travel greater than zero, and the movement linking element moves in the slit and cutouts to cause the intermediate pipe to move a second longitudinal distance of travel greater than the first longitudinal distance of travel, wherein the slit in the intermediate pipe and the cutout in the inner pipe having a gradient less than 90 degrees and greater than zero degrees, and the slit in the intermediate pipe has a greater gradient than the cutout in the inner pipe with respect to the transverse plane.

15. A travel multiplying device comprising:

at least one outer pipe, one inner pipe, and one intermediate pipe positioned between the inner pipe and the outer pipe, the pipes being movable relative to each other in the longitudinal direction, each by a particular longitudinal distance of travel, with the intermediate pipe having a slit, and the inner pipe and the outer pipe each having at least one cutout formed between facing surfaces of the inner pipe and the outer pipe, the cutouts and slit having different gradients relative to a transverse plane through the pipes, the outer pipe, the inner pipe, and the intermediate pipe are coupled with each other by at least one movement linking element extending through the slit and into the cutout of the inner pipe and the cutout of the outer pipe, and the movement linking element moving within the slit and moving longitudinally relative to the cutouts to link movements of the inner pipe and intermediate pipe, the inner pipe being moved a first longitudinal distance of travel greater than zero, and the movement linking element moving in the slit and cutouts, to cause the intermediate pipe to move a second longitudinal distance of travel greater than the first longitudinal distance of travel, wherein the cutouts are grooves; and the groove of the inner pipe forming two pairs of grooves and the slit in the intermediate pipe forming two pairs of slits, wherein the grooves of the inner pipe and the slits are formed in a manner symmetrical towards the longitudinal axis of the inner pipe.

16. The travel multiplying device as in of claim 15 wherein the slits of the intermediate pipe are arranged in pairs corresponding to the grooves of the inner pipe.

17. The travel multiplying device as in claim 16 wherein the grooves of the inner pipe have a first inner pipe transverse plane extending through one end of the inner pipe cutouts and a second inner pipe transverse plane extending through a second end of the inner pipe cutouts, the slits of the intermediate pipe have a first intermediate pipe transverse plane extending through one end of the intermediate pipe slits and a second transverse plane extending through a second end of the intermediate pipe slits with the first inner pipe transverse plane and second inner pipe transverse plane being closer together than the first intermediate pipe transverse plane and second intermediate pipe transverse plane.

18. The travel multiplying device as in claim 17 wherein the first inner pipe transverse plane and the first intermediate pipe transverse plane are the same transverse plane and the grooves of the inner pipe in projection towards the same transverse plane have a length different than the slits of the intermediate pipe.

19. A travel multiplying device comprising:

at least one outer pipe, one inner pipe, and one intermediate pipe positioned between the inner pipe and the outer pipe, the inner pipe and the intermediate pipe being movable relative to the other in the longitudinal direction and each being movable in the longitudinal direction by a particular longitudinal distance of travel greater than zero, with the intermediate pipe having a slit and the inner pipe and the outer pipe each have a wall with at least one cutout formed between facing wall surfaces of the inner pipe and the outer pipe, the cutouts not extending through the walls of the inner pipe and the outer pipe, the at least one cutout of the inner pipe and slit having different gradients relative to a transverse plane through the pipes, the at least one outer pipe, the inner pipe, and the intermediate pipe are coupled with each other by at least one movement linking element extending through the slit and into the cutouts of the inner pipe and the outer pipe to link the movements of the inner pipe and intermediate pipe, wherein the first of the inner pipe or the outer pipe is fixed and the second of the inner pipe or the outer pipe has a non-circular longitudinal cutout and the intermediate pipe has a longitudinal slit allowing the first of the inner pipe or the outer pipe and the intermediate pipe to be rotated relative to the second of the inner pipe or the outer pipe, the second of the inner pipe or the outer pipe being movable a first longitudinal distance of travel greater than zero, and the movement linking element moves longitudinally in the longitudinal slit and cutouts to cause the intermediate pipe to move a second longitudinal distance of travel greater than the first longitudinal distance of travel.

20. An apparatus utilizing a travel initiating element for moving an adjusting element in a valve, throttle, or blowout prevent, the adjusting element having a longitudinal axis, the apparatus comprising:

a first tubular member fixed with respect to the adjusting element and having a first bore therethrough, the first tubular member having a first cutout extending circumferentially within the bore transverse to the longitudinal axis;

a second tubular member having a second bore therethrough forming a wall and being received within said first bore, the second tubular member having at least a second cutout extending through the wall, the second cutout being at a first angle with the longitudinal axis, the second tubular member having one end connected to the adjusting element;

a third tubular member having at least a third cutout on the exterior thereof, the third cutout extending at a second angle within the bore transverse to the longitudinal axis, the second angle being smaller than the first angle, the third tubular member having one end connected to the travel initiating element;

the second tubular member and the third tubular member being movable along the longitudinal axis with respect to the first tubular member;

a linking element received by the first cutout, second cutout, and third cutout, the second tubular member and third tubular member moving with respect to the linking element as the second tubular member and third tubular member move longitudinally; and the second tubular member moving a greater longitudinal distance along the longitudinal axis than the third tubular member upon actuation of the travel initiating element.

21. The apparatus of claim 20 wherein the third cutout has an axial length shorter than the axial length of the second cutout allowing the linking element to travel further in the second cutout than the third cutout.

22. The apparatus of claim 20 wherein there are two pairs of second cutouts and two corresponding pairs of third cutouts, wherein the linking element includes a ball for each corresponding second cutouts and third cutouts, to produce longitudinal movement of the second tubular member and third tubular members.

23. The apparatus of claim 20 wherein the linking element travels in the first cutout, second cutout, and third cutout, as the second tubular member and third tubular member move.

24. The apparatus of claim 23 wherein the first cutout, second cutout and third cutout have portions aligned throughout the travel of the linking element.

25. A travel multiplying device comprising:

at least one outer pipe, one inner pipe, and one intermediate pipe positioned between the inner pipe and the outer pipe, the inner pipe and the intermediate pipe being movable relative to the other in the longitudinal direction and each being movable in the longitudinal direction by a particular longitudinal distance of travel greater than zero; the intermediate pipe having a slit and the inner pipe and the outer pipe each having a wall with at least one cutout formed between facing wall surfaces of the inner pipe and the outer pipe, the cutouts not extending through the walls of the inner pipe and the outer pipe, the cutouts and slit having different gradients relative to a transverse plane through the pipes, the outer pipe, the inner pipe, and the intermediate pipe which are coupled with each other by at least one movement linking element extending through the slit and into the cutouts of the inner pipe and the outer pipe to link the movements of the inner pipe and intermediate pipe, wherein one of the inner pipe or the outer pipe is fixed and the other of the inner pipe or the outer pipe has a non-circular longitudinal cutout and the intermediate pipe has a longitudinal slit allowing the other of the inner pipe or the outer pipe and the intermediate pipe to be rotated relative to one of the inner pipe or the outer pipe, the other of the inner pipe or the outer pipe being movable a first longitudinal distance of travel greater than zero, the movement linking element moves longitudinally in the longitudinal slit and cutouts to cause the intermediate pipe to move a second longitudinal distance of travel greater than the first longitudinal distance of travel.

* * * * *

UNITED STATES PATENT AND TRADEMARK OFFICE
CERTIFICATE OF CORRECTION

| | | |
|---|---|---|
| PATENT NO. | : 7,654,164 B2 | Page 1 of 1 |
| APPLICATION NO. | : 10/489374 | |
| DATED | : February 2, 2010 | |
| INVENTOR(S) | : Biester et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 523 days.

Signed and Sealed this

Twenty-eighth Day of December, 2010

David J. Kappos
*Director of the United States Patent and Trademark Office*